United States Patent
Hatano et al.

(12) 
(10) Patent No.: US 6,303,402 B1
(45) Date of Patent: Oct. 16, 2001

(54) METHOD OF MANUFACTURING NEAR FIELD LIGHT GENERATING DEVICE

(75) Inventors: Takuji Hatano, Shiga-ken; Akira Sato, Suita, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/604,408

(22) Filed: Jun. 27, 2000

(30) Foreign Application Priority Data

Jul. 2, 1999 (JP) .................................................. 11-189131

(51) Int. Cl.[7] .............................. H01L 21/00; H01L 21/84
(52) U.S. Cl. ............................. 438/22; 438/158; 438/161
(58) Field of Search .................................. 438/3, 22, 151, 438/152, 158, 161, 160, 167

(56) References Cited

U.S. PATENT DOCUMENTS

| | | | |
|---|---|---|---|
| 4,211,561 | * 7/1980 | Plambeck, Jr. ....................... | 430/606 |
| 4,772,096 | * 9/1988 | Kai et al. ............................. | 350/276 |
| 5,472,815 | * 12/1995 | Mizuguchi et al. .................. | 430/17 |
| 5,497,359 | 3/1996 | Mamin et al. . | |
| 5,583,675 | * 12/1996 | Yamada et al. ...................... | 349/84 |
| 5,689,480 | 11/1997 | Kino . | |
| 5,718,991 | * 2/1998 | Lin et al. ............................. | 430/5 |
| 5,962,975 | * 10/1999 | Lepselter ............................. | 313/586 |

* cited by examiner

*Primary Examiner*—Michael Lebentritt
(74) *Attorney, Agent, or Firm*—Morrison & Foerster LLP (57) ABSTRACT

A method of manufacturing a near field light generating device is provided. A photoresist layer is formed on a transparent layer (123). Then, illumination light (L2) directed from the side of solid immersion lenses (11) passes through first openings (122*a*) and the transparent layer (123) to reach and expose the photoresist layer. After development of the photoresist layer, exposed parts of the photoresist remain as microscopic resist regions (MR) in positions corresponding to the first openings (122*a*). After a second opaque layer (124) is formed on the transparent layer (123) and the microscopic resist regions (MR), the microscopic resist regions (MR) are removed by a lift-off method to form second openings (124*a*) in the second opaque layer (124). The first openings (122*a*) are thus used as a photomask to form the second openings (124*a*). Therefore, a large number of microscopic openings (MO) having good product quality are formed accurately and easily as the near field light generating device.

10 Claims, 8 Drawing Sheets

ILLUMINATION LIGHT L2

THROUGHPUT VS. 1ST OPENING WIDTH
(TRANSPARENT LAYER (SiN) THICKNESS = 81 nm, 2ND OPENING = 132 nm)

METHOD OF MANUFACTURING NEAR FIELD LIGHT GENERATING DEVICE

This application is based on an application No. 11-189131 filed in Japan, the contents of which are hereby incorporated by reference.

BACKGROUND OF THE INVENTION

1. Field of the Invention

The present invention relates to a method of forming a microscopic opening serving as a near field light generating device by a photolithographic technique using illumination light.

2. Description of the Background Art

In conventional optical recording, a recording density has an upper limit determined by the diffraction limit (which means that the size of a spot focused by diffraction of light is not infinitesimal), and hence only marks having a size on the order of magnitude of the wavelength of light (hundreds of nanometers) can be read or written.

In recent years, a technique which utilizes near field light (evanescent light) to increase the recording density in optical recording has attracted particular attention. A recording method which utilizes the near field light makes it possible to read marks as small as tens of nanometers in size beyond the diffraction limit of light by reducing a spacing between an optical head and a recording medium down to tens of nanometers. On similar principles, it also becomes possible to form microscopic patterns beyond the diffraction limit by using the near field light.

In these techniques using the near field light, an optical probe is desired which can form a microscopic light spot with as high an intensity as possible. To this end, there has been proposed a fiber probe having an opening at a sharp-pointed tip of a fiber. However, the size of the opening of a probe on the order of 100 nm causes an extremely low intensity of transmitted light, for example, on the order of 1/100 or below, resulting in low efficiency of use of light.

To overcome this problem, a technique has been proposed which produces a tapered microscopic opening by anisotropically etching a thin film of single crystalline silicon and directs light into the microscopic opening to generate near field light from the microscopic opening (as disclosed in U.S. Pat. No. 5,689,480).

Unfortunately, the technique disclosed in U.S. Pat. No, 5,689,480, in which etching is used to produce the tapered microscopic opening, has poor reproducibility of the microscopic opening, presenting difficulties in maintaining good product quality. This technique also requires precise control of etching time, resulting in low yields.

SUMMARY OF THE INVENTION

The present invention is intended for a method of manufacturing a near field light generating device. According to the present invention, the method comprises the steps of: forming a first opaque layer on a transparent substrate, the first opaque layer having a first opening and an opaque portion; forming a transparent layer on the first opaque layer; forming a photosensitive layer on the transparent layer; exposing the photosensitive layer to illumination light transmitted through the first opening to form a microscopic region of an exposed photosensitive material; forming a second opaque layer on the transparent layer and the microscopic region; and removing the microscopic region and a portion of the second opaque layer overlying the microscopic region to form a second opening in the second opaque layer.

The method of the present invention uses the first opening as a photomask for the formation of the second opening, to accurately form the second opening, thereby easily forming a microscopic opening having good product quality. Furthermore, when forming a plurality of microscopic openings in parallel, this method eliminates the need for the positioning of a plurality of photomasks relative to each other in the step of forming the second openings, to easily form a large number of microscopic openings.

Preferably, the transparent layer is transparent to light for use in generating near field light.

The microscopic opening thus formed can generate near field light.

Preferably, the transparent layer has a thickness ranging from about one-tenth to about twice the wavelength of the illumination light.

This allows the first opening and the second opening to differ in size.

According to another aspect of the present invention, the method comprises the steps of: forming a first opaque layer on a transparent substrate; forming a first opening in the first opaque layer; forming a transparent layer on the first opaque layer; forming a photosensitive layer on the transparent layer; exposing the photosensitive layer to illumination light transmitted through the first opening to form a microscopic region of an exposed photosensitive material; forming a second opaque layer on the transparent layer and the microscopic region; and removing the microscopic region and a portion of the second opaque layer overlying the microscopic region to form a second opening in the second opaque layer.

The present invention is also intended for a device for generating near field light, the device being manufactured by the steps consisting essentially of: forming a first opaque layer on a transparent substrate, the first opaque layer having a first opening and an opaque portion; forming a transparent layer on the first opaque layer; forming a photosensitive layer on the transparent layer; exposing the photosensitive layer to illumination light transmitted through the first opening to form a microscopic region of an exposed photosensitive material; forming a second opaque layer on the transparent layer and the microscopic region; and removing the microscopic region and a portion of the second opaque layer overlying the microscopic region to form a second opening in the second opaque layer.

It is therefore an object of the present invention to provide a method of easily forming a large number of microscopic openings having good product quality.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>

Figure 1:
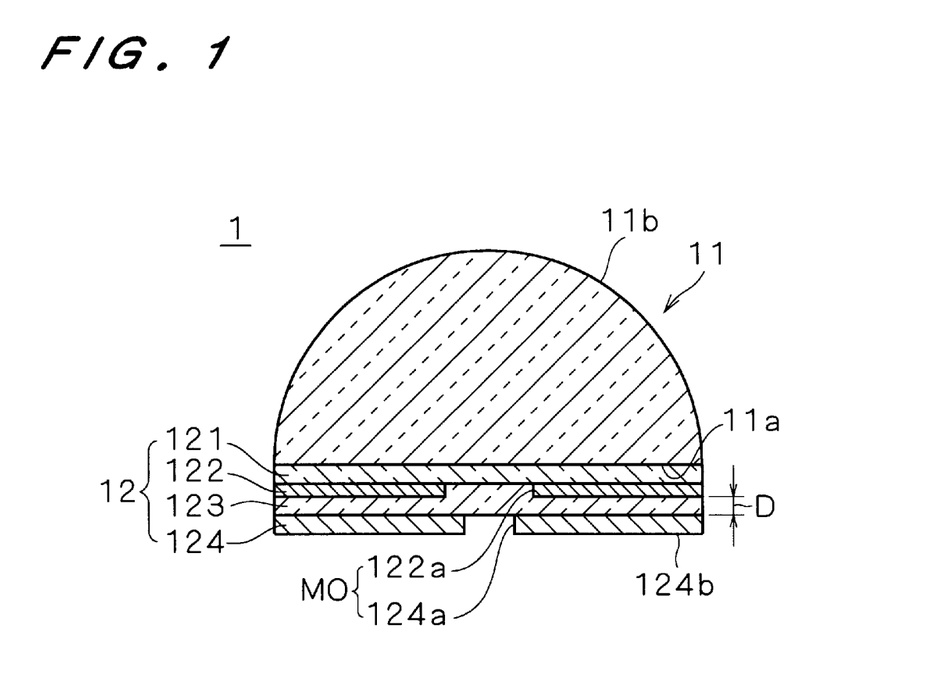
FIG. 1 is a cross-sectional view of a near field light generating device having a microscopic opening formed by a method of forming a microscopic opening according to the present invention.

A first preferred embodiment according to the present invention will now be described with reference to the drawings. FIG. 1 is a cross-sectional view of a near field light generating device 1 having a microscopic opening MO formed by a method of forming a microscopic opening according to the present invention. As illustrated in FIG. 1, the near field light generating device 1 comprises a solid immersion lens 11 having a lower planar surface 11a, and a light blocker 12 provided on the lower planar surface 11a and having the microscopic opening MO formed by the method according to the first preferred embodiment of the present invention.

The solid immersion lens 11 is a substantially hemispherical lens made of a material with a high refractive index, as is well known in the art. The principle of generation of near field light by the solid immersion lens 11 is an application of the principle of liquid immersion lens microscope (enhancement of microscope resolution by a liquid immersion method).

The light blocker 12 has a multi-layer structure comprising a transparent substrate 121, a first opaque layer 122, a transparent layer 123, and a second opaque layer 124 which are stacked in the order named as viewed from the side of the solid immersion lens 11. The first opaque layer 122 and the second opaque layer 124 have a first opening 122a and a second opening 124a, respectively, which are formed centrally thereof and have a slit-like (elongated rectangular) configuration. The first and second openings 122a and 124a are disposed in alignment with each other within a plane (X-Y plane) parallel to the lower planar surface 11a, and the second opening 124a is smaller (accordingly less in slit width perpendicular to the longitudinal direction of the slit-like openings) than the first opening 122a. The first and second openings 122a and 124a thus formed constitute the microscopic opening MO.

The transparent substrate 121 and the transparent layer 123 in the near field light generating device 1 are transparent to the wavelength of illumination light (illumination light IL2 to be described later) for use in the method of forming a microscopic opening to be described later (in a photolithographic step) and also transparent to the wavelength of incident light IL for use in generating near field light by using the near field light generating device 1 according to the first preferred embodiment. Similarly, the first opaque layer 122 and the second opaque layer 124 are opaque to the wavelength of the illumination light and to the wavelength of the incident light IL.

The transparent substrate 121 is a clear substrate. The first opaque layer 122 is a thin film of metal, and has a thickness of about tens of nanometers. The first opening 122a of the first opaque layer 122 has a slit width less than the wavelength of the incident light IL by about tens of to hundreds of nanometers. The transparent layer 123 is a thin dielectric film, and has a thickness which is about one-quarter the wavelength of the incident light IL. The second opaque layer 124, similar to the first opaque layer 122, is a thin film of metal, and has a thickness approximately equal to the thickness of the first opaque layer 122. The second opening 124a of the second opaque layer 124 has a slit width which is about one-half that of the first opening 122a.

The incident light IL is linearly polarized light, and enters the near field light generating device 1 so that the polarization direction thereof near the first and second openings 122a and 124a is parallel to the longitudinal direction of the first and second openings 122a and 124a.

Figure 2:
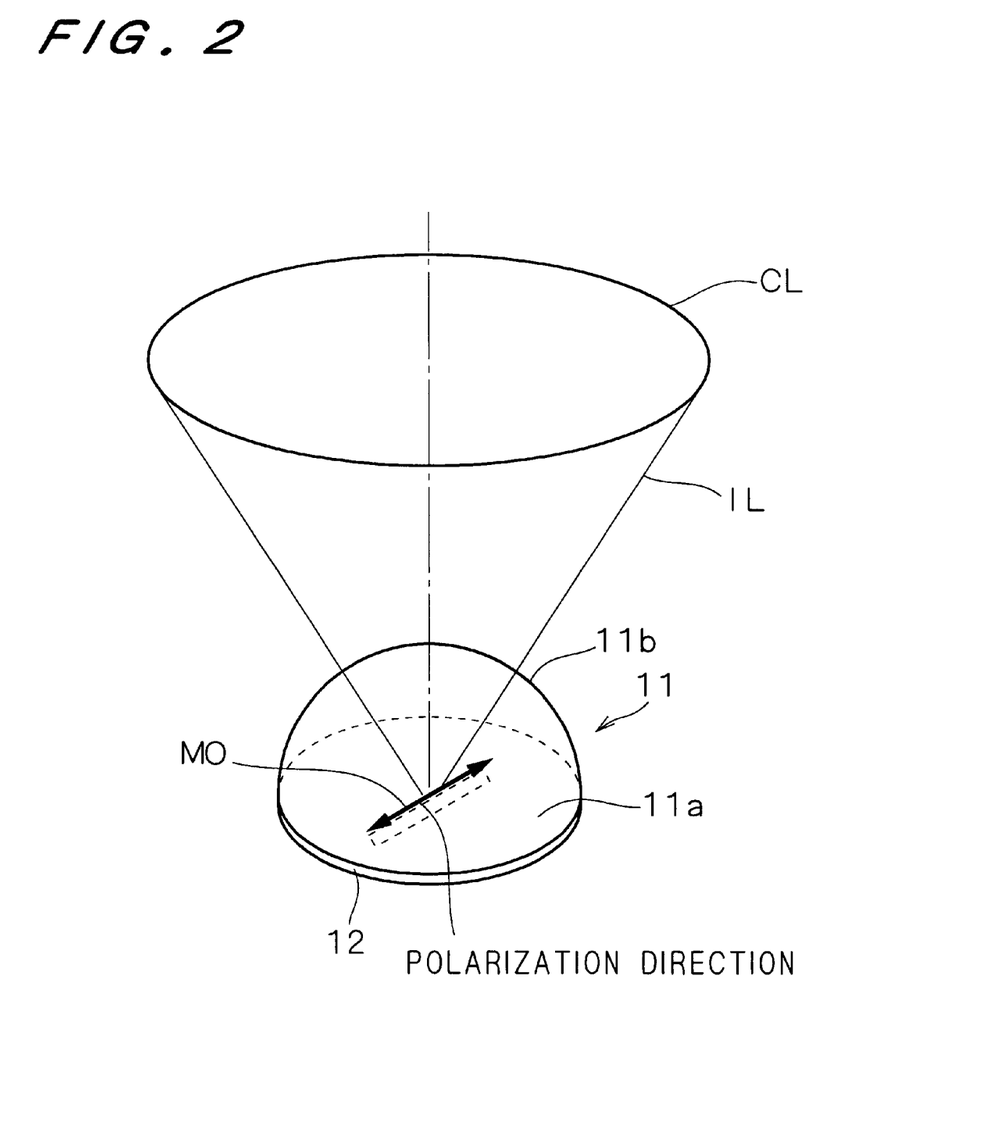
FIG. 2 shows the generation of near field light by the use of the near field light generating device.

FIG. 2 shows the generation of near field light by the use of the near field light generating device 1. The generation of near field light by the use of the near field light generating device 1 will be described with reference to FIG. 2. As depicted in FIG. 2, the incident light IL which is laser light emitted from a light source not shown is focused by a condenser lens CL and enters the solid immersion lens 11 at its hemispherical surface 11b to form a light spot on the order of magnitude of the diffraction limit near the center of the lower planar surface 11a. Then, the incident light IL is focused by the first opening 122a, passes through the transparent layer 123 to reach the second opening 124a which in turn further reduces the beam width of the incident light IL. Thereafter, the incident light IL reaches a lower surface 124b of the light blocker 12, whereby near field light is generated from the lower surface 124b at the position of the second opening 124a.

FIGS. 3A, 3B, 3C, 4A, 4B, 4C, 5A, 5B and 5C show a procedure of the method of forming a microscopic opening according to the first preferred embodiment of the present invention. The method of the present invention using, as an example, a dry etching technique is described hereinafter with reference to these figures.

Figure 3A:
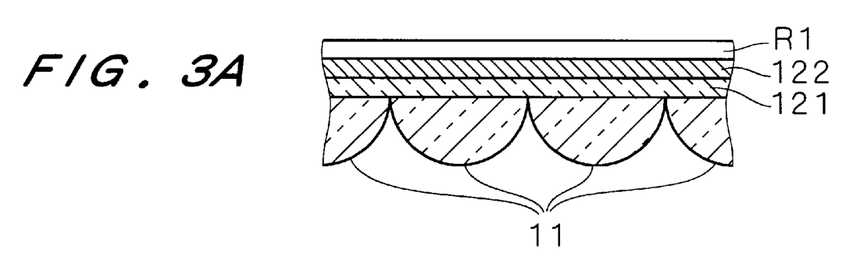
FIGS. 3A, 3B, 3C, 4A, 4B, 4C, 5A, 5B and 5C show a procedure of the method according to a first preferred embodiment of the present invention.

First, as shown in FIG. 3A, the first opaque layer 122 (a layer of metal such as aluminum, gold, silver or copper) is formed by a known deposition method (vacuum evaporation, sputtering, CVD or the like) on an opposite surface of the transparent substrate 121 (made of glass, quartz, plastic or the like) from a multiplicity of solid immersion lenses 11 with the lower planar surface 11a bonded to the transparent substrate 121. Thereafter, a photoresist layer R1 is formed on the first opaque layer 122 by a known method such as spin coating. The photoresist used herein is positive.

Figure 3B:
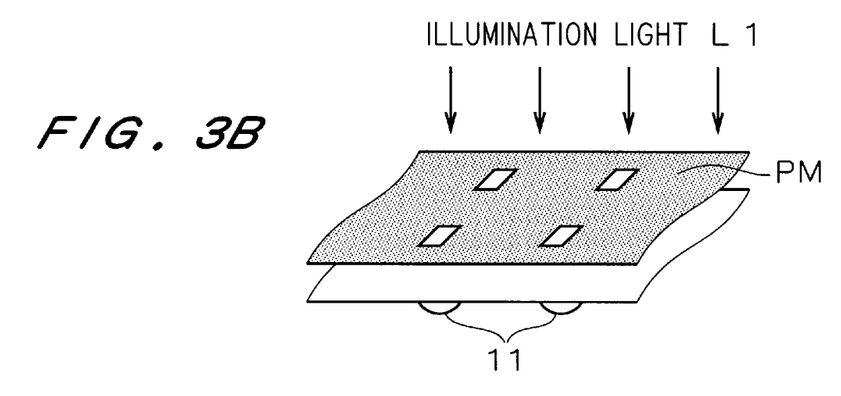

Next, as shown in FIG. 3B, illumination light Li (more specifically, ultraviolet (UV) light or the like capable of microscopic processing) is directed through a photomask PM onto the photoresist layer RI formed in the preceding step. The photomask PM used herein has an opening in a position corresponding to each first opening 122a to be described later. The photomask PM is positioned so that a part of the photoresist layer R1 exposed to the illumination light L1 is at the center of each of the solid immersion lenses 11.

Figure 3C:
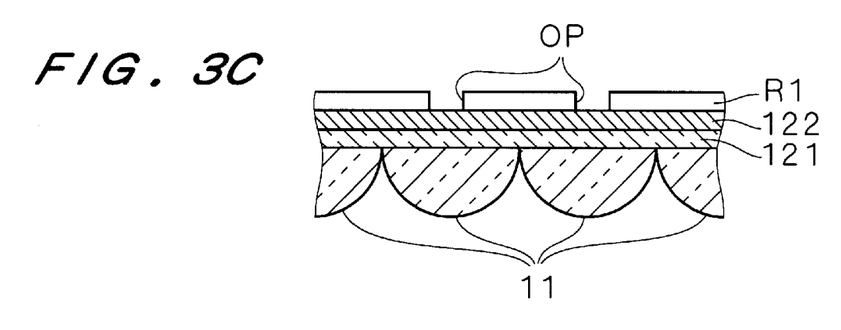

Next, as shown in FIG. 3C, openings OP (from which the photoresist is removed) are formed in the photoresist layer R1 by development.

Figure 4A:
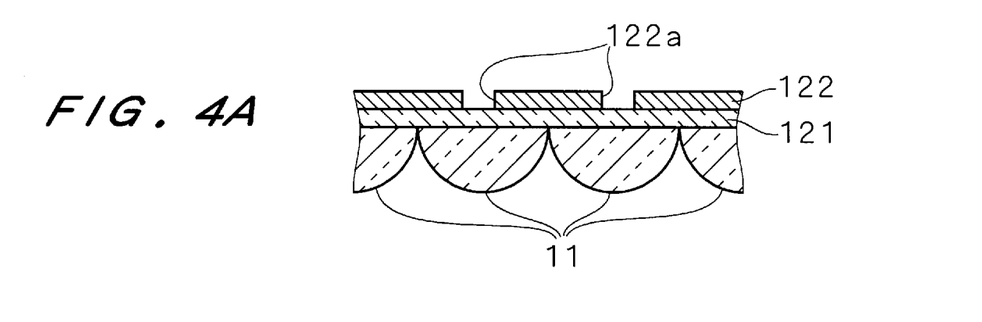

Then, as shown in FIG. 4A, the first openings 122a are formed in the first opaque layer 122 by a known etching process. The etching process used herein may be either dry etching or wet etching, but dry etching is preferable in terms of accuracy. Gas for use in etching is selected as appropriate depending on the metal to be used. For example, when aluminum is used for the opaque layer, the use of $Cl_2$ gas is suitable.

Figure 4B:
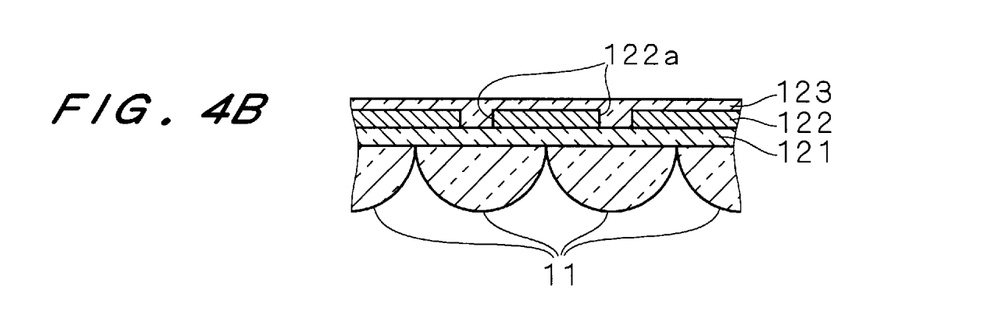

Next, as shown in FIG. 4B, the transparent layer 123 (a dielectric layer made of SiN or the like) is formed on the first opaque layer 122 in a manner similar to that described with reference to FIG. 3A.

Figure 4C:
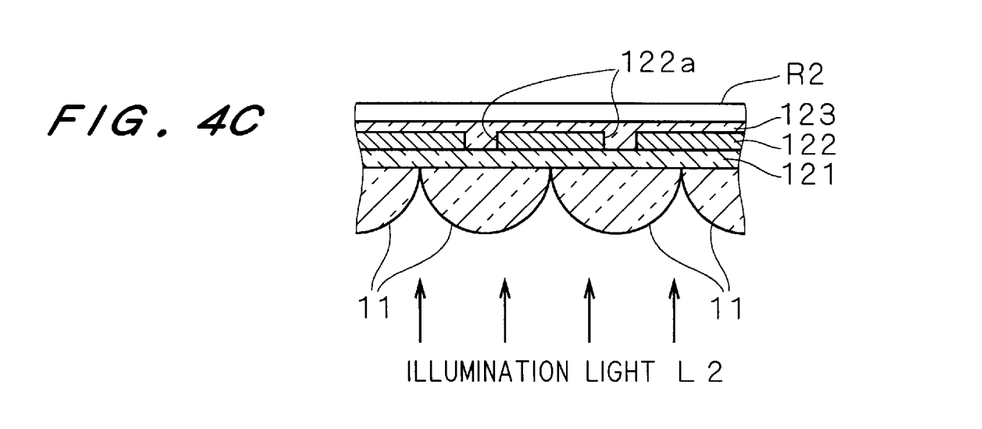

Then, as shown in FIG. 4C, a photoresist layer R2 is formed on the transparent layer 123 in a manner similar to that described with reference to FIG. 3A. Thereafter, illumination light L2 (more specifically, UV light or the like capable of microscopic processing) is directed onto the resultant structure from the opposite side of the transparent substrate 121 from the microscopic openings MO to be formed later (i.e. from the side of the solid immersion lenses 11). Then, the illumination light L2 passing through the solid immersion lenses 11 also passes through the first openings 122a and the transparent layer 123 to reach the photoresist layer R2. The photoresist used herein is negative.

Figure 5A:
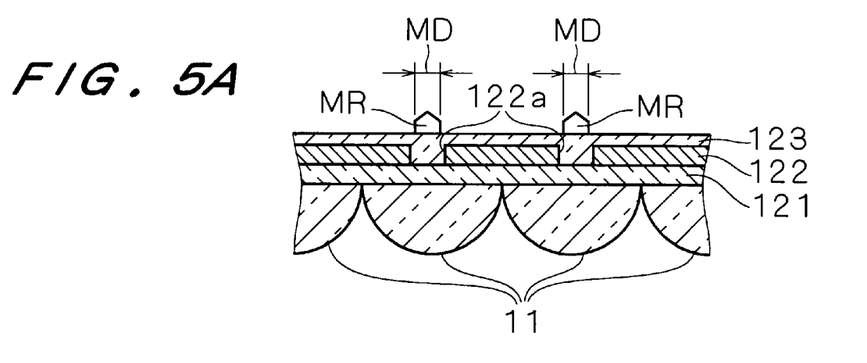

Next, as shown in FIG. 5A, development is carried out in a manner similar to that described with reference to FIG. 3C to leave parts of the photoresist exposed in the step shown in FIG. 4C, thereby forming microscopic resist regions MR. The microscopic resist regions MR are smaller (and accordingly less in slit width) than the first openings 122a.

A distance between the first opaque layer 122 and the second opaque layer 124, i.e. the thickness D (See FIG. 1) of the transparent layer 123, preferably ranges from about one-tenth to about twice the wavelength of the illumination light L2, and the thickness D of the transparent layer 123 in this preferred embodiment is designed as such. If the thickness D is less than one-tenth the wavelength of the illumination light L2, the first and second opaque layers 122 and 124 are too close to each other relative to the wavelength of the illumination light L2. As a result, the exposed parts of the photoresist layer R2 are approximately equal in size (accordingly in slit width) to the first openings 122a. This produces the microscopic resist regions MR approximately equal in size to the first openings 122a (i.e., the width MD of the microscopic resist regions MR is approximately equal to the slit width of the first openings 122a). Thus, the desired smaller second openings 124a (having a smaller slit width) are not produced. On the other hand, if the thickness D is greater than about twice the wavelength of the illumination light L2, the illumination light L2 which is once focused diverges again. As a result, the second openings 124a smaller (and accordingly less in slit width) than the first openings 122a are not produced. Therefore, only when the above conditions are satisfied, the illumination light L2 transmitted through the first openings 122a has an electric field intensity distribution less than the size of the first openings 122a (and accordingly less than the slit width of the first openings 122a), and produces the second openings 124a smaller (and accordingly less in slit width) than the first openings 122a.

The illumination light L2 is preferably linearly polarized light (See FIG. 2) parallel to the longitudinal direction of the first openings 122a (and accordingly the second openings 124a), and the illumination light L2 in this preferred embodiment is designed as such. If the illumination light L2 having a polarized light component perpendicular to the longitudinal direction of the first openings 122a is used for exposure, the electric field intensity distribution after the illumination light L2 passes through the first openings 122a is approximately equal to the slit width of the first openings 122a, and an electric field intensity distribution having a smaller width is not obtained. Therefore, the use of the illumination light L2 having only a polarized light component parallel to the longitudinal direction of the first openings 122a for exposure produces a higher effect. More specifically, linear polarized light into which a polarizer converts laser light or randomly polarized light may be used as the illumination light L2.

Figure 5B:
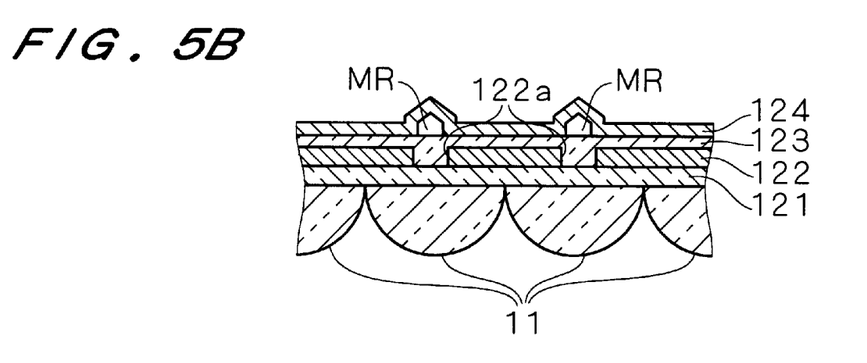

Next, as shown in FIG. 5B, the second opaque layer 124 (a metal layer similar to the first opaque layer 122) is deposited on the transparent layer 123 and the microscopic resist regions MR. The material of the second opaque layer 124 may differ from that of the first opaque layer 122.

Figure 5C:
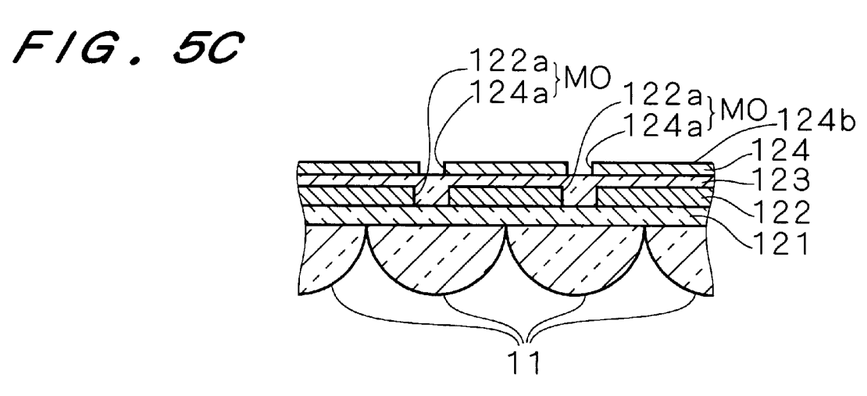

Finally, as shown in FIG. 5C, the microscopic resist regions MR and parts of the second opaque layer 124 which overlie the microscopic resist regions MR are removed by a lift-off method, to form the second openings 124a in the second opaque layer 124 in alignment with the first openings 122a. Since the microscopic resist regions MR are smaller than the first openings 122a as described above, the second openings 124a formed in this step are also smaller (and accordingly less in slit width) than the first openings 122a. The first openings 122a and the second openings 124a thus produced constitute the microscopic openings MO capable of generating the intended near field light.

A multiplicity of near field light generating devices 1 thus manufactured are cut and separated from each other, brought to the commercial stage, and used individually.

As described hereinabove, the method of forming a microscopic opening according to this preferred embodiment comprises exposing the photosensitive layer to the light transmitted through the first opening 122a formed in the first opaque layer 122 to form the microscopic region of exposed photosensitive material, and then removing the microscopic region after the formation of the second opaque layer 124 to form the second opening 124a. In other words, this method uses the first opening 122a as a photomask for the formation of the second opening 124a. This prevents photomask positioning errors which have been encountered when a separate photomask is used for exposure, to accurately form the second opening 124a, thereby easily forming the microscopic opening MO having good product quality. Furthermore, when forming a plurality of microscopic openings MO in parallel, this method eliminates the need for the positioning of a plurality of photomasks PM relative to each other in the step of forming the second openings 124a, to easily form a large number of microscopic openings MO.

Additionally, the transparent substrate 121 and the transparent layer 123 are transparent to the wavelengths of the illumination light L2 and the incident light IL, and the first and second opaque layers 122 and 124 are opaque to the wavelengths of the illumination light L2 and the incident light IL. Therefore, the microscopic opening MO thus formed can generate the near field light by selecting a suitable wavelength of the incident light IL.

Further, the transparent substrate 121 and the transparent layer 123 are made of a clear dielectric material, and the first and second opaque layers 122 and 124 are made of metal. Therefore, the near field light generating device 1 according to the first preferred embodiment of the present invention may be manufactured at lower costs than the conventional device comprising a silicon substrate, and also is allowed to easily possess a necessary rigidity to facilitate handling such as retention and mounting to equipment.

Furthermore, when the second opening 124a is formed in alignment with the first opening 122a as viewed in plan view, the first opening 122a is used as a photomask PM for the formation of the second opening 124a. Therefore, the second opening 124a is easily formed in alignment with the first opening 122a as viewed in plan view.

Moreover, the thickness of the transparent layer 123 which ranges from about one-tenth to about twice the wavelength of the illumination light L2 provides the difference in size between the first and second openings 122a and 124a, and particularly allows the second opening 124a to be smaller (and accordingly less in slit width) than the first opening 122a.

The present invention is not limited to the method of forming a microscopic opening an example of which is shown according to this preferred embodiment.

For example, the near field light generating device 1 provided by forming the light blocker 12 mounted to the solid immersion lens 11 generates near field light in the first preferred embodiment. However, the method of the present invention may be used to produce a slit for use in conventional optical recording or a microscopic opening for a photomask.

The photoresist layer RI which is positive in the first preferred embodiment may be negative, in which case the photomask to be used must be patterned such that a portion corresponding to other than the first opening 122a is removed.

Furthermore, the first and second openings 122a and 124a which are of slit-like configuration in the first preferred embodiment may have square, circular or other configurations.

<Second Preferred Embodiment>

Figure 6:
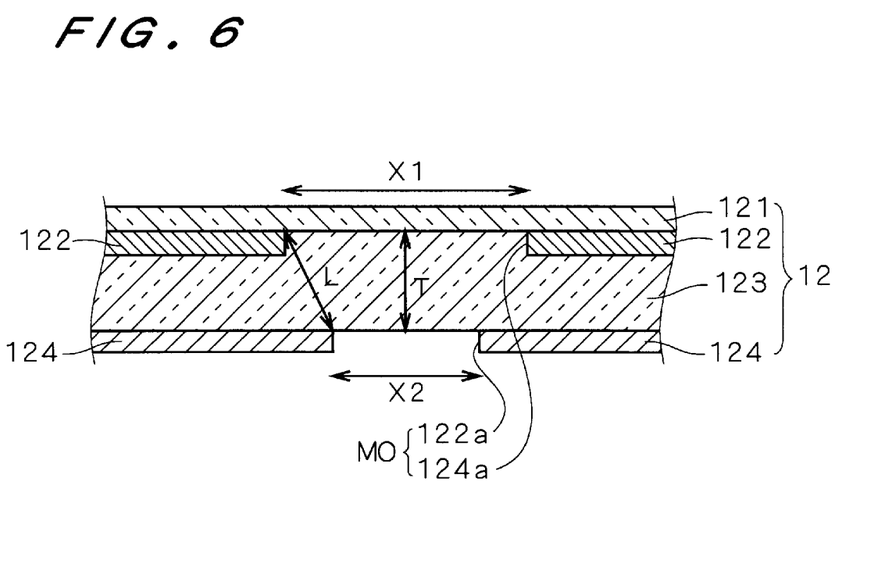
FIG. 6 is a cross-sectional view of a light blocker having, a microscopic opening formed by the method according to a second preferred embodiment of the present invention.

A second preferred embodiment of the present invention will now be described with reference to the drawings. FIG. 6 is a cross-sectional view of the light blocker 12 having the microscopic opening MO formed by the method according to the second preferred embodiment of the present invention. The lower planar surface 11a of the solid immersion lens 11 is mounted to the light blocker 12 on the side of the first opening 122a into intimate contact therewith, whereby the near field light generating device is formed.

An example of the light blocker 12 (double-slit) having an optimum configuration for a blue laser is illustrated in the second preferred embodiment. More specifically, the configuration of the light blocker 12 is optimized by simulation. The steps of forming a microscopic opening in the second preferred embodiment is substantially similar to those in the first preferred embodiment except that the illumination light does not pass through the solid immersion lens. Members of the near field light generating device 1 of the second preferred embodiment which are similar to those of the first preferred embodiment are designated by the same reference numerals and characters.

The method of forming a microscopic opening according to the second preferred embodiment will be described hereinafter. In the following steps, the near field light generating device 1 of FIG. 6 is manufactured in an inverted position by sequentially stacking the layers.

First, the first opaque layer 122 serving, as a light blocking film having the first opening 122a is formed on the planar transparent substrate 121 made of glass in a manner substantially similar to that of the first preferred embodiment. The first opaque layer 122 is made of aluminum and has a thickness of 30 nm. The first opening 122a has a length (a longitudinal dimension) of 3 $\mu$m which is sufficiently greater than a beam diameter obtained when laser light having a wavelength of 420 nm is focused by a lens with NA (numerical aperture)=0.6. The first opening 122a has a slit width (a transverse dimension) of 270 nm.

Figure 7A:
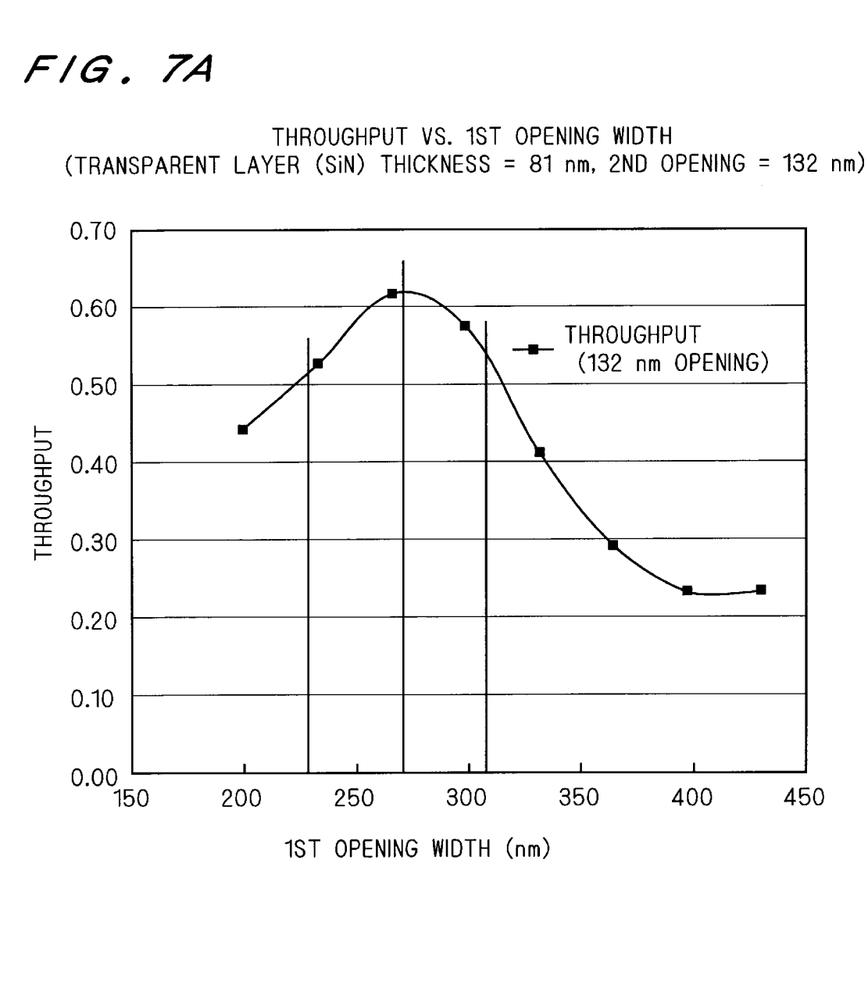
FIG. 7A shows a simulation result of a throughput versus the width of a first opening.
Figure 7B:
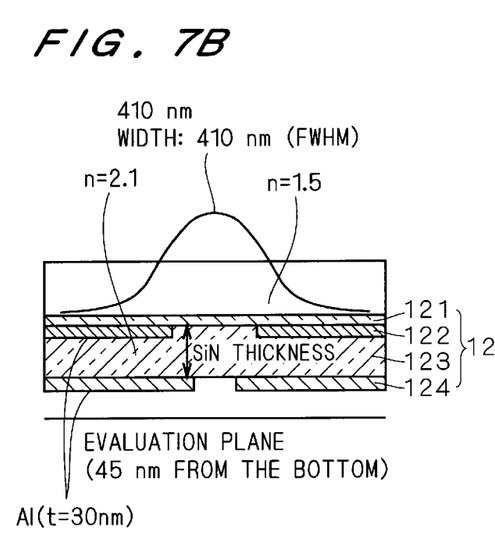
FIG. 7B shows conditions of the simulation of FIG. 7A.

FIG. 7A shows a simulation result of a throughput versus the width of the first opening 122a. FIG. 7B shows the conditions of the simulation. In this simulation, the thickness of the transparent layer 123 to be described later is 81 nm, the slit width of the second opening 124a is 132 nm, the thicknesses of the first and second opaque layers 122 and 124 are 30 nm, the spacing between the second opening 124a and the read surface (or recording surface) is 45 nm, the half-width of incident light is 410 nm, the refractive index of the solid immersion lens 11 is 1.5, and the refractive index of the transparent layer 123 is 2.1. This simulation result shows that the throughput reaches a maximum value when the slit width of the first opening 122a is 270 nm which is therefore optimum.

It is also found from the simulation result of FIG. 7A that the throughput whose value ranges from about 90% to 100% of its maximum value requires the slit widths of the first and second openings 122a and 124a to satisfy the relationship $$1.7X2 < X1 < 2.4X2$$

where X1 is the slit width of the first opening 122a and X2 is the slit width of the second opening 124a.

Next, the transparent layer 123 is formed on the first opaque film 122. The transparent layer 123 is made of SiN and has a thickness of 70 nm.

Figure 8A:
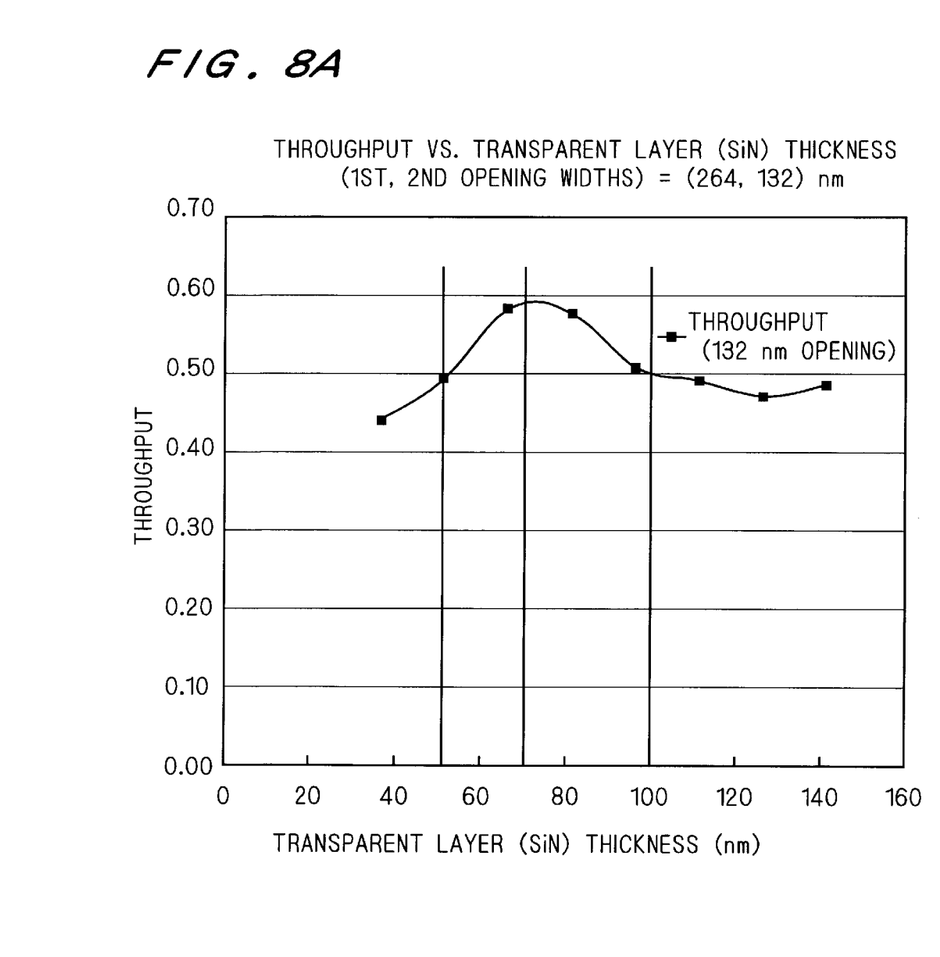
FIG. 8A shows a simulation result of a throughput versus the thickness of a transparent layer.
Figure 8B:
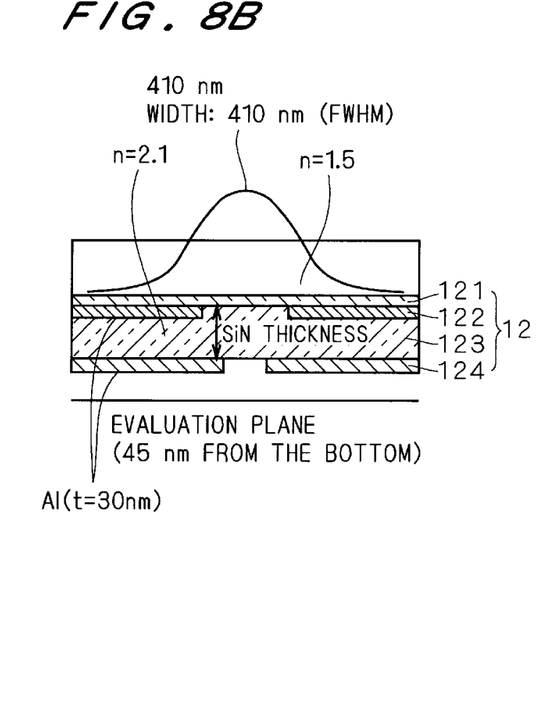
FIG. 8B shows conditions of the simulation of FIG. 8A.

FIG. 8A shows a simulation result of a throughput versus the thickness of the transparent layer 123. FIG. 8B shows the conditions of the simulation. The conditions of the simulation shown in FIGS. 8A and 8B are similar to those shown in FIGS. 7A and 7B except that the slit width of the first opening 122a is fixed at 264 nm and the thickness of the transparent layer 123 is changed. This simulation result shows that, in consideration for the thickness of the first opaque layer 122, the optimum thickness of the transparent layer 123 is 70 nm as measured from the bottom surface of the transparent substrate 121 to the second opening 124a.

Next, a resist is applied to the transparent layer 123, and then illumination light having a sufficiently large beam diameter is directed from the side of the transparent substrate 121 toward the first opening 122a to expose the resist. The direction of polarization of the light for exposure is the same as the longitudinal direction of the first opening 122a. Then, a microscopic resist region similar to those of the first preferred embodiment (FIG. 5A) is formed by development. The illumination light having a diameter of about 10 $\mu$m and a wavelength of about 420 nm is suitable.

Next, the second opaque layer 124 is formed in a manner substantially similar to that of the first preferred embodiment, and then the second opening 124a is formed by a lift-off method. The second opening 124a has a length (a longitudinal dimension) of about 3 $\mu$m and a slit width of about 130 nm. The second opaque layer 124 is made of aluminum and has a thickness of 30 nm.

The lower planar surface 11a of the solid immersion lens 11 is mounted to the resultant light blocker 12 on the side of the first opening 122a into intimate contact therewith. This provides the near field light generating device capable of generating near field light having a small width of 110 nm with a throughput of 60% when a condenser optical system with NA (numerical aperture)=0.6 directs laser light having a wavelength of 420 nm thereon.

A distance L between the edge of the first opening 122a and the edge of the second opening 124a is $$L = \{T^2 + (X1-X2)^2/4\}^{0.5}$$

where T is the thickness of the transparent layer 123. Then, it is preferable that the wavelength $\lambda$ of incident light for use in generating near field light through the first opening 122a satisfies the relationship:

$$0.4\lambda < nL < 0/6\lambda$$

where n is the refractive index of the transparent layer 123. This relationship allows multiple reflection to be mutually intensified at the edges of the first and second openings 122a and 124a.

The first and second openings 122a and 124a may be rectangular, square or circular in configuration. However, the rectangular configuration is most effective.

While the invention has been described in detail, the foregoing description is in all aspects illustrative and not restrictive. It is understood that numerous other modifications and variations can be devised without departing from the scope of the invention.

What is claimed is:

1. A method of manufacturing a near field light generating device, comprising the steps of:

forming a first opaque layer on a transparent substrate, said first opaque layer having a first opening and an opaque portion;

forming a transparent layer on said first opaque layer;

forming a photosensitive layer on said transparent layer;

exposing said photosensitive layer to illumination light transmitted through said first opening to form a microscopic region of an exposed photosensitive material;

forming a second opaque layer on said transparent layer and said microscopic region; and removing said microscopic region and a portion of said second opaque layer overlying said microscopic region to form a second opening in said second opaque layer.

2. The method according to claim 1, wherein said first opaque layer and said second opaque layer intercept said illumination light.

3. The method according to claim 2, wherein said first opaque layer and said second opaque layer intercept light for use in generating near field light.

4. The method according to claim 2, wherein said transparent layer is transparent to light for use in generating near field light.

5. The method according to claim 1, wherein said transparent layer has a thickness ranging from about one-tenth to about twice the wavelength of said illumination light.

6. The method according to claim 1, wherein said first opening and said second opening are rectangular in shape.

7. The method according to claim 1, wherein the widths of said first and second openings satisfy $$1.7 < X1/X2 < 2.4$$

where X1 is the width of said first opening and X2 is the width of said second opening.

8. The method according to claim 1, wherein the widths of said first and second openings, the thickness of said transparent layer, and the wavelength of incident light for use in generating near filed light satisfy $$0.4 < n\{T^2 + (X1-X2)^2/4\}^{0.5}/\lambda < 0.6$$

where X1 is the width of said first opening, X2 is the width of said second opening, T is the thickness of said transparent layer, $\lambda$ is the wavelength of said incident light, and n is the refractive index of said transparent layer.

9. A method of manufacturing a near field light generating device, comprising the steps of:

forming a first opaque layer on a transparent substrate;

forming a first opening in said first opaque layer;

forming a transparent layer on said first opaque layer;

forming a photosensitive layer on said transparent layer;

exposing said photosensitive layer to illumination light transmitted through said first opening to form a microscopic region of an exposed photosensitive material;

forming a second opaque layer on said transparent layer and said microscopic region; and removing said microscopic region and a portion of said second opaque layer overlying said microscopic region to form a second opening in said second opaque layer.

10. A device for generating near field light, said device being manufactured by the steps consisting essentially of:

forming a first opaque layer on a transparent substrate, said first opaque layer having a first opening and an opaque portion;

forming a transparent layer on said first opaque layer;

forming a photosensitive layer on said transparent layer;

exposing said photosensitive layer to illumination light transmitted through said first opening to form a microscopic region of an exposed photosensitive material;

forming a second opaque layer on said transparent layer and said microscopic region; and removing said microscopic region and a portion of said second opaque layer overlying said microscopic region to form a second opening in said second opaque layer.

* * * * *